(12) United States Patent
Rijshouwer et al.

(10) Patent No.: US 9,535,701 B2
(45) Date of Patent: Jan. 3, 2017

(54) EFFICIENT USE OF BRANCH DELAY SLOTS AND BRANCH PREDICTION IN PIPELINED COMPUTER ARCHITECTURES

(71) Applicant: Telefonaktiebolaget L M Ericsson (publ), Stockholm (SE)

(72) Inventors: Erik Rijshouwer, Nuenen (NL); Ricky Nas, Eindhoven (NL)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 365 days.

(21) Appl. No.: 14/167,973

(22) Filed: Jan. 29, 2014

(65) Prior Publication Data
US 2015/0212821 A1    Jul. 30, 2015

(51) Int. Cl.
*G06F 9/38* (2006.01)
*G06F 9/30* (2006.01)

(52) U.S. Cl.
CPC ......... *G06F 9/3806* (2013.01); *G06F 9/30058* (2013.01); *G06F 9/3842* (2013.01); *G06F 9/3844* (2013.01)

(58) Field of Classification Search
CPC ................................ G06F 9/38; G06F 9/3806
See application file for complete search history.

(56) References Cited

U.S. PATENT DOCUMENTS

| | | | |
|---|---|---|---|
| 5,724,563 A | 3/1998 | Hasegawa | |
| 5,784,603 A * | 7/1998 | Leung | G06F 9/3804 712/23 |
| 5,864,697 A | 1/1999 | Shiell | |
| 6,189,091 B1 | 2/2001 | Col et al. | |
| 6,598,152 B1 | 7/2003 | Sinharoy | |
| 6,622,240 B1 * | 9/2003 | Olson | G06F 9/30058 712/233 |
| 2003/0172259 A1 | 9/2003 | Mori et al. | |

(Continued)

FOREIGN PATENT DOCUMENTS

| | | |
|---|---|---|
| EP | 0 355 069 A2 | 2/1990 |
| EP | 0 689 131 A1 | 12/1995 |

(Continued)

OTHER PUBLICATIONS

PCT International Search Report, mailed Jun. 17, 2015, in connection with International Application No. PCT/EP2015/055656, all pages.

(Continued)

*Primary Examiner* — Eric Coleman
(74) *Attorney, Agent, or Firm* — Leffler Intellectual Property Law, PLLC

(57) ABSTRACT

A pipelined processor selects an instruction fetch mode from a number of fetch modes including an executed branch fetch mode, a predicted fetch mode, and a sequential fetch mode. Each branch instruction is associated with branch delay slots, the size of which can be greater than or equal to zero, and can vary from one branch instance to another. Branch prediction is used to fetch instructions, with the source of information for predictions deriving from a last instruction in the branch delay slots. When a prediction error occurs, the executed branch fetch mode uses an address from branch instruction evaluation to fetch a next instruction.

23 Claims, 13 Drawing Sheets

(56) References Cited

U.S. PATENT DOCUMENTS

| | | | |
|---|---|---|---|
| 2003/0226003 A1* | 12/2003 | Tago | G06F 9/3802 |
| | | | 712/238 |
| 2004/0003217 A1 | 1/2004 | Ukai | |
| 2005/0125786 A1 | 6/2005 | Dai et al. | |
| 2005/0149710 A1 | 7/2005 | Hikichi | |
| 2006/0184738 A1 | 8/2006 | Bridges et al. | |
| 2010/0050164 A1 | 2/2010 | Van De Waerdt et al. | |
| 2011/0264862 A1 | 10/2011 | Karlsson et al. | |

FOREIGN PATENT DOCUMENTS

| | | | |
|---|---|---|---|
| WO | 99/54810 A1 | 10/1999 | |
| WO | 2008/072178 A1 | 6/2008 | |

OTHER PUBLICATIONS

Kevin Skadron et al., "Speculative Updates of Local and Global Branch History: A Quantitative Analysis", Jan. 1, 2000, retrieved from the Internet on Jun. 30, 2014.

Pleszkun A R et al., "WISQ: A Restartable Architecture Using Queues", Proceedings of the Annual International Symposium on Computer Architecture. Pittsburgh, Jun. 2-5, 1987; Washington, IEEE Comp. Soc. Press, US, vol. Symp. 14, Jun. 2, 1987, pp. 290-299.

PCT International Search Report, mailed May 11, 2015, in connection with International Application No. PCT/EP2015/051119, all pages.

Notice of Allowance issued May 6, 2016 in connection with U.S. Appl. No. 14/228,436, 26 pages.

"Migrating from MIPS to ARM, Application Note 235" ARMDAI0235C, 2010, pp. 1-22, ARM Limited, http://www.arm.com.

Su, Ching-Long et al. "Branch with Masked Squashing in Superpipelined Processors" Proceedings of the 21st Annual International Symposium on Computer Architecture, pp. 130-140, 1994.

McFarling, Scott "Combining Branch Predictors" WRL Technical Note TN-36, Jun. 1993, Western Research Laboratory, Palo Alto, CA, USA, pp. 1-25.

\* cited by examiner

| | Cycle 1 (prediction) | Cycle 2 | Cycle 3 | Cycle 4 | Cycle 5 (evaluation) | Cycle 6 |
|---|---|---|---|---|---|---|
| IF1 prediction: | Branch T -> Instr11 | Instr11 | Instr12 | Instr13 | Instr14 | Instr15 |
| IF2 | Instr5 | Branch | Instr11 | Instr12 | Instr13 | Instr14 |
| ID1 | Instr4 | Instr5 | Branch | Instr11 | Instr12 | Instr13 |
| ID2 | Instr3 | Instr4 | Instr5 | Branch | Instr11 | Instr12 |
| EXE | Instr2 | Instr3 | Instr4 | Instr5 | Branch | Instr11 |

FIG. 3 (Prior Art)

EFFICIENT USE OF BRANCH DELAY SLOTS AND BRANCH PREDICTION IN PIPELINED COMPUTER ARCHITECTURES

BACKGROUND

The invention relates to pipelined computer architectures, and more particularly to efficient use of branch delay slots and branch prediction in pipelined computer architectures.

Programmable computers comprise processing circuitry and some sort of storage mechanism ("memory") for storing data and program instructions. In their simplest form, computers operate on a principle in which an instruction is fetched from memory and the processor executes (i.e., performs) the instruction. Execution of instructions may involve fetching one or more data operands from memory and/or register locations, producing some sort of data based on the fetched data, and then storing the result into a memory and/or register location.

A key characteristic of programmable processors is the ability for the processor itself to select which one of a number of sets of instructions will be executed based on the present state of one or more conditions. To take a very simple example, if a particular data item has a value of zero, the program designer may intend for one set of instructions to be performed, whereas if the particular data item has a nonzero value, the program designer may intend for a different set of instructions to be performed. The tested data item may have different values at different times during program execution, so the performance of the program may change over time.

To enable this type of functionality, instructions are by default designed to be executed in sequence. Each storage location in memory is associated with an address (essentially, a number), and instructions that are intended to be unconditionally executed in sequence are stored in memory locations having sequentially increasing addresses. The processor might, for example start operating by fetching and then executing the instruction located at memory address 0, followed by fetching and then executing the instruction located at memory address 1, and so on.

In order to change the flow of program execution, branch instructions are introduced. Typically the fetching of a branch instruction causes the processor to test whatever condition(s) is specified by the instruction. If the test outcome is that the condition is not satisfied, then the next instruction is fetched from the memory location that immediately follows the location at which the branch instruction is stored. However, if the test outcome is that the condition is satisfied, then instead of fetching the instruction that immediately follows the branch instruction, an instruction fetch is performed from a non-sequential memory address whose value is in some way specified by the branch instruction.

Pipelines

Through the years, computer engineers have come up with many ways of enabling computers to execute more instructions in less time. Of course, one way is simply to reduce the amount of time it takes to fetch instructions and execute them. Another way is to introduce parallelism into the architecture; that is, to allow different aspects of processing to take place concurrently. One type of architecture that exploits parallelism is a so-called pipelined architecture, in which each instruction is executed in a sequence of stages. As one instruction moves from one stage in the pipeline to the next, another instruction takes its place. When each of the stages has an instruction in it, and with the stages operating in parallel, the amount of time it takes to execute one instruction is effectively the amount of time it spends in one of the stages because, when each stage of a pipeline has a different instruction in it, a new execution result is produced at the end of the pipeline every time an instruction is shifted from one stage to the next.

More particularly an instruction pipeline splits up each instruction into a sequence of dependent steps. Consider an exemplary pipelined processor consisting of the following stages:

Stage 1: Instruction fetch (IF1)
Stage 2: Instruction fetch (IF2)
Stage 3: Instruction decode and register fetch (ID1)
Stage 4: Instruction decode and register fetch (ID2)
Stage 5: Execute (EXE)

One consequence of splitting up instruction processing in this manner is that the effect of an instruction will not be reflected in the architectural state (i.e., performance of the instruction is not yet completed) before the next instruction is fetched. The number of cycles in an unstalled pipeline between the fetching of the instruction and its execution is referred to as the pipeline latency.

If the correct execution of an instruction depends on the result of a previous not yet completed instruction, a pipeline hazard occurs. Hazards can be avoided in both software (by properly re-scheduling instructions) and hardware (by stalling or forwarding).

Branches

Program code is rarely linear and thus, as explained earlier, contains jumps (branches) from one position in the code (branch source) to another position (branch target). Also as explained above, branches can be conditional: the branch is taken when the condition holds, otherwise it is not taken. The branch target and branch condition can be data dependent or data independent. These potential dependencies put constraints on the scheduling freedom of branches.

A branch target can only be fetched once it is known (i.e. the branch has been executed, at which time the branch condition is resolved and the branch target address computed).

The instructions to be executed following execution of the branch (i.e., the target instructions) are dependent on the correct execution of that branch. This means that the fetching of the target instructions to be executed following the branch can only reliably start after the branch has been executed.

FIG. 1*a* illustrates a code segment that includes a branch instruction. In this example, instructions (Instr) are numbered sequentially. A branch instruction has been placed just after Instr6. In this document, with respect to branches, the following notation is used:

"(NT)" means that a branch execution will result in the branch not being taken (i.e., the next sequentially occurring instruction following the branch will be executed)

"(T)→Instr#" means that the branch condition has been satisfied so that a branch will be taken, and that the target is Instr# (where "#" represents an instruction number)

It can therefore be seen that, in the Example of FIG. 1*a*, the illustrated branch instruction has target 101 if the branch is not taken (NT), and target 103 if the branch is taken (T). In this example, branch execution results in the branch being taken, with the target instruction being Instr11. This means that the NT target instructions 101 will not be executed.

FIG. 1*b* is a processing sequence diagram 150 that illustrates how the branch instruction of FIG. 1*a* would be processed in the exemplary pipelined processor mentioned above. Each rectangle shows what instruction is contained in a given stage (IF1, IF2, ID1, ID2, EXE) of the pipeline. Time proceeds from left to right in the figure, and is denoted in terms of cycle number.

The example starts in Cycle 0, at which point the contents of stages EXE, ID2, ID1, IF2, and IF1are Instr6, Branch, Instr7, Instr8, and Instr9 respectively. It will be understood that instructions Instr7, Instr8, and Instr9 have been fetched under the assumption that instructions should be fetched from sequential memory addresses unless an executed Branch instruction requires a different action.

In Cycle 1, Instr6 is no longer in the pipeline and each of the remaining instructions has advanced one stage in the pipeline. Although not shown in the Figure, the next sequential instruction, Instr10, has been fetched and loaded into the first stage of the pipeline (i.e., the IF1 stage). The Branch instruction has reached the EXE stage of the pipeline and the contents of stages ID2, ID1, IF2, and IF1 are Instr 7, Instr8, Instr9, and Instr10, respectively.

However, as mentioned above, in this example the branch is to be taken, with the target being Instr11. The pipelined execution of the taken branch in the EXE stage during Cycle 1 means that the already fetched and partially-processed instructions contained in the earlier stages of the pipeline (i.e., stages IF1, IF2, ID1, and ID2) are the NT target instructions 101, and these should not be allowed to change the state of the computer. For this reason, the exemplary pipelined processor is configured not to execute (and thereby not to change the state of the processor) when each of these already fetched instructions reaches the EXE stage of the pipeline. This type of non-execution is called an "idle cycle". In the example of FIG. 1b, it can be seen that the branch instruction in cycle 1 causes the next four cycles to be idle cycles in the EXE stage, with the next instruction to be executed (Instr 11) not reaching the EXE stage until Cycle 6.

This means that 4 cycles of processor time are essentially wasted, which is an undesirable effect. There are two commonly used ways to prevent the functional units of the processor from becoming idle due to the pipeline having to wait for the execution of the branch: branch delay slots and branch prediction. These are discussed in the following:

Branch Delay Slots

One way of reducing the number of idle cycles associated with a branch taken condition in a pipelined processor is position the branch instruction within the set of instructions such that the sequentially next instructions immediately following branch instruction are instructions that need to be executed regardless of whether the outcome of branch execution is "taken" or "not taken". This technique is illustrated in FIG. 2. Three similar program segments are shown: "Original program" 250; "Branch with 4 branch delay slots filled" 260; and "Branch with 2 of 4 branch delay slots filled" 270. For each of these, it is assumed that the program is executed by a 5-stage pipelined processor as discussed earlier. For each of the examples, instructions Instr6 through Instr10 are the target instructions if the branch is not taken 201, and the instructions starting with Instr11 are the target instructions if the branch is taken 203.

The Original program 250 is very much like the one shown in FIG. 1a: the illustrated portion begins with five instructions (Instr1, . . . , Instr5) followed by a conditional branch instruction. Following the conditional branch instruction, another seven instructions are depicted (Instr6, . . . , Instr12). In this example, the condition tested by the branch instruction is satisfied, so the branch will be taken, with the target starting at Instr11 (i.e., instructions Instr6 through Instr10 are not to be executed). When this program segment is executed in the pipelined processor, the effect is as shown in FIG. 1b: there will be four idle cycles before the target instruction, Instr11, is executed.

It will be observed that if the compiler were to advance the placement of the branch by 4 instructions, as depicted in the example called "Branch with 4 branch delay slots filled" 260, the pipeline latency would be completely hidden for this branch. This is because when the branch instruction is in the EXE stage of the pipeline, the remaining four stages of the pipeline will be working on instructions Instr2 through Instr5 which, according to the Original program 250, are required to be executed regardless of the outcome of the branch.

When this technique is used, the instruction positions that fill the pipeline stages when the branch instruction is in the EXE stage of the pipeline are called "branch delay slots". This technique of repositioning the branch instruction to an earlier position within the program code separates the location that the branch instruction occupies in the program code from the branch source (i.e., the position in the code from which execution jumps to another location based on the outcome of the branch instruction). That is, the last branch delay slot is now the branch source.

Thus, branch delay slots are scheduling slots for instructions representing the pipeline latency of their associated branch. The number of branch delay slots is therefore conventionally fixed and equal to roughly the pipeline depth. The branch delay slots are positioned directly after the branch instruction and are always executed, irrespective of the outcome of the branch instruction.

The branch delay slot strategy is not perfect, however, because branches can only be advanced up to the slot immediately following the last instruction that determines the branch behavior. If, in the Original program 250 shown in FIG. 2, execution of the instruction "Instr3" determines the branch behavior (i.e., the state that will be tested in the branch condition), the branch cannot be advanced any earlier than "Instr3" because it would be evaluating the state of a condition that had not yet been determined. In this case, only instructions "Instr4" and "Instr5" can be used to fill the branch delay slots, leaving two unfilled branch delay slots. The unfilled branch delay slots will contain so-called NOPs ("No Operation" instructions—instructions that do not change the state of the computer). This is illustrated in the program segment called "Branch with 2 of 4 branch delay slots filled" 270. Every NOP will lead to an idle functional unit and thus to performance loss.

Branch Prediction

Another way to mitigate the performance loss due to pipeline latency when a branch is performed is to predict the outcome of a branch in advance of the branch's actual time of execution. Ideally, for the exemplary pipelined processor, the target of a branch would be predicted when the branch source is in the IF1 stage. This would allow the branch target to be fetched during the next cycle, and no performance loss would occur.

The prediction of branches is done by a specialized unit: the branch prediction unit (BPU). A BPU contains memories to keep track of the branch information that becomes available once a branch has been executed. When a branch is fetched, the BPU's internal algorithms predict the branch information (what the target instruction is, whether the branch will be taken (i.e., "branch direction", etc.) based on historical and/or contextual information with respect to this branch. Branch prediction techniques are described in, for example, Scott McFarling, "Combining Branch Predictors", WRL Technical Note TN-36, Jun. 1993, pp. 1-25, Digital Western Research Laboratory, Palo Alto, Calif., USA.

Having predicted the target and direction of the branch in IF1, the predicted target is fetched in the very next cycle, so that there need not be any idle cycles regardless of branch outcome if the prediction is correct. FIG. 3 is a processing sequence diagram 300 that illustrates the performance improvement that can be achieved when branch target and direction can be correctly predicted. Using the same exemplary code segment shown as "Original program" in FIG. 2 and an exemplary 5-stage pipelined processor with branch prediction, the processing sequence diagram 300 shows the pipeline in Cycle 1, at which point instructions Instr2, Instr3, instr4 and Instr5 are in pipeline stages EXE, ID2, ID1, and IF2, respectively. Further, the branch instruction has just been loaded into pipeline stage IF1.

In this example, the prediction made in the IF1 stage is that the branch will be "taken", and the target is Instr11 (denoted in the figure as "T→Instr11"). Accordingly, in Cycle 2, the predicted target instruction (Instr11) is fetched and loaded into the IF1 stage when the instructions in each of the other stages advance one stage in the pipeline. Since there are no other branch instructions in this example, instructions are fetched from sequential memory locations in each of cycles 3, 4, 5, and 6.

The actual evaluation of the branch instruction takes place when the branch instruction reaches the EXE stage in Cycle 5. Assuming that the prediction was correct (i.e., that the branch is taken with Instr11 being the target), the target instruction reaches the EXE stage in the very next cycle (Cycle 6). In this manner, the need for idle cycles has been avoided.

It is noted that technology has not yet advanced to the point at which it is always possible to make perfect branch predictions. For this reason, pipelined architectures continue to suffer from idle cycles even when branch prediction technology is employed.

The inventors have determined that each of the conventional techniques for dealing with idle cycles that result from execution of branch instructions in a pipelined processor falls short in a number of aspects. It is therefore desired to provide improved technology for avoiding the occurrence of idle cycles.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof. Also, as used herein the term "exemplary" means serving as one illustration out of any number of possible illustrations.

It is also emphasized that, as used herein, the term "unit of data" is intended to be a generic term that defines an amount of data that is retrieved from one memory storage location when a read operation is performed. Those of ordinary skill in the art will understand that the size of a "unit of data" in one embodiment can be different from the size of a unit of data in another embodiment.

In accordance with one aspect of the present invention, the foregoing and other objects are achieved in methods and apparatuses for controlling a pipelined processor having a plurality of serially connected processing stages including a first stage and a branch evaluation stage, wherein one of the processing stages other than the branch evaluation stage is a prediction stage that supplies branch source information for making branch predictions, and wherein the pipelined processor is operatively coupled to a memory that comprises a plurality of addressable storage locations, each storage location being for storing one unit of data. Control of the pipelined processor includes, for each one of a plurality of sequentially occurring cycles, selecting an instruction fetch mode from a plurality of fetch modes comprising an executed branch fetch mode, a predicted fetch mode, and a sequential fetch mode; producing a memory address in accordance with the selected instruction fetch mode; using the memory address to select one of the addressable storage locations and fetching a unit of data from the selected storage location, wherein the fetched unit of data includes a fetched instruction; and loading the fetched instruction into the first stage of the pipelined processor.

In these embodiments, the pipelined processor executes instructions from an instruction set that includes a branch instruction, with each branch instruction being associated with a set of branch delay slots whose size can be greater than or equal to zero and whose size can be different from one instance of a branch instruction to another.

The executed branch fetch mode comprises producing the memory address by evaluating a branch instruction loaded in the branch evaluation stage of the pipelined processor.

The predicted fetch mode comprises generating a decision indicating whether an instruction loaded in the prediction stage represents the last branch delay slot of the set of branch delay slots; and in response to the decision indicating that the instruction loaded in the prediction stage represents the last branch delay slot of the set of branch delay slots, predicting the memory address based at least partly on the branch source information supplied by the prediction stage.

The sequential fetch mode comprises producing the memory address as a memory address that is a sequentially next occurring address after a present address.

In some but not necessarily all embodiments, selecting the instruction fetch mode comprises selecting the executed branch fetch mode if evaluation of a branch instruction loaded in the branch evaluation stage of the pipelined processor indicates that at least one instruction loaded in one or more of the processing stages was fetched because of an earlier-occurring branch prediction error; selecting the predicted fetch mode if at least the following criteria are true: the executed branch fetch mode is not being selected and a decision has been generated that indicates that an instruction loaded in the prediction stage represents the last branch delay slot of the set of branch delay slots; and selecting the sequential fetch mode if neither the executed branch mode nor the predicted branch mode is selected.

In some but not necessarily all embodiments, selecting the instruction fetch mode further comprises selecting the executed branch fetch mode if a branch instruction is loaded in the branch evaluation stage of the pipelined processor and no decision has yet been generated that indicates that an instruction loaded in the prediction stage represents the last branch delay slot of the set of branch delay slots associated with the branch instruction.

In some but not necessarily all embodiments, selecting the instruction fetch mode further comprises selecting the executed branch fetch mode if a branch instruction is loaded in the branch evaluation stage of the pipelined processor and no prediction regarding the branch instruction has been made.

In some but not necessarily all embodiments, selecting the predicted fetch mode comprises selecting the predicted fetch mode if at least the following criteria are true: the executed branch fetch mode is not being selected and a decision has been generated that indicates that an instruction loaded in the prediction stage represents the last branch delay slot of the set of branch delay slots and a prediction can be generated.

In some but not necessarily all embodiments, generating the decision indicating whether the instruction loaded in the prediction stage represents the last branch delay slot of the set of branch delay slots comprises using the branch source information supplied by the prediction stage to predict the decision indicating whether the instruction loaded in the prediction stage represents the last branch delay slot of the set of branch delay slots.

In some but not necessarily all embodiments, controlling the pipelined processor includes flushing the at least one instruction loaded in one or more of the processing stages that was fetched because of an earlier-occurring branch prediction error, wherein an idle cycle results from execution of a flushed instruction in a last stage of the pipelined processor.

In some but not necessarily all embodiments, the prediction stage is the first stage of the pipelined processor. In some but not necessarily all alternative embodiments, the prediction stage is a second stage of the pipelined processor.

In some but not necessarily all embodiments, the branch instruction is a conditional branch instruction.

In some but not necessarily all embodiments, controlling the pipelined processor includes training a branch predictor based on branch evaluation results generated by the branch evaluation stage when the branch instruction is loaded in the branch evaluation stage and on an address of an instruction that represents the last branch delay slot of the set of branch delay slots associated with the branch instruction.

Other embodiments include complete pipelined processor embodiments, comprising a plurality of serially connected processing stages including a first stage and a branch evaluation stage; a memory that comprises a plurality of addressable storage locations, each storage location being for storing one unit of data, wherein the pipelined processor is operatively coupled to the memory; and a controller configured to cause the pipelined processor to function in accordance with any of the herein-described aspects.

BRIEF DESCRIPTION OF THE DRAWINGS

The objects and advantages of the invention will be understood by reading the following detailed description in conjunction with the drawings in which:

FIG. 3 is a processing sequence diagram that illustrates the performance improvement that can be achieved when branch target and direction can be correctly predicted in a pipelined processor.

DETAILED DESCRIPTION

Figure 1:
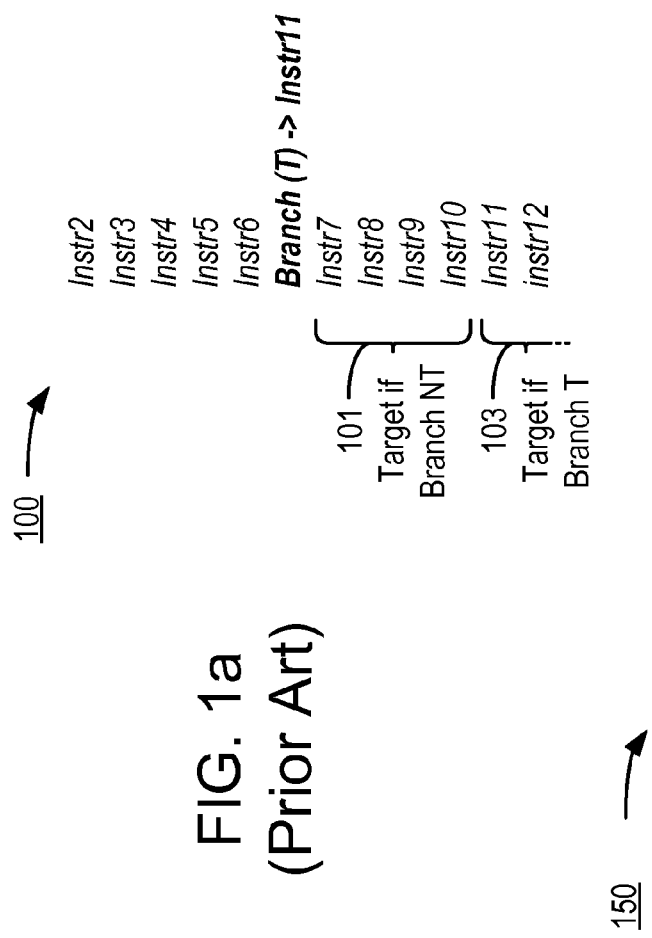
FIG. 1a illustrates a code segment that includes a branch instruction.
FIG. 1b is a processing sequence diagram that illustrates how the branch instruction of FIG. 1a would be processed in an exemplary pipelined processor.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

Figure 2:
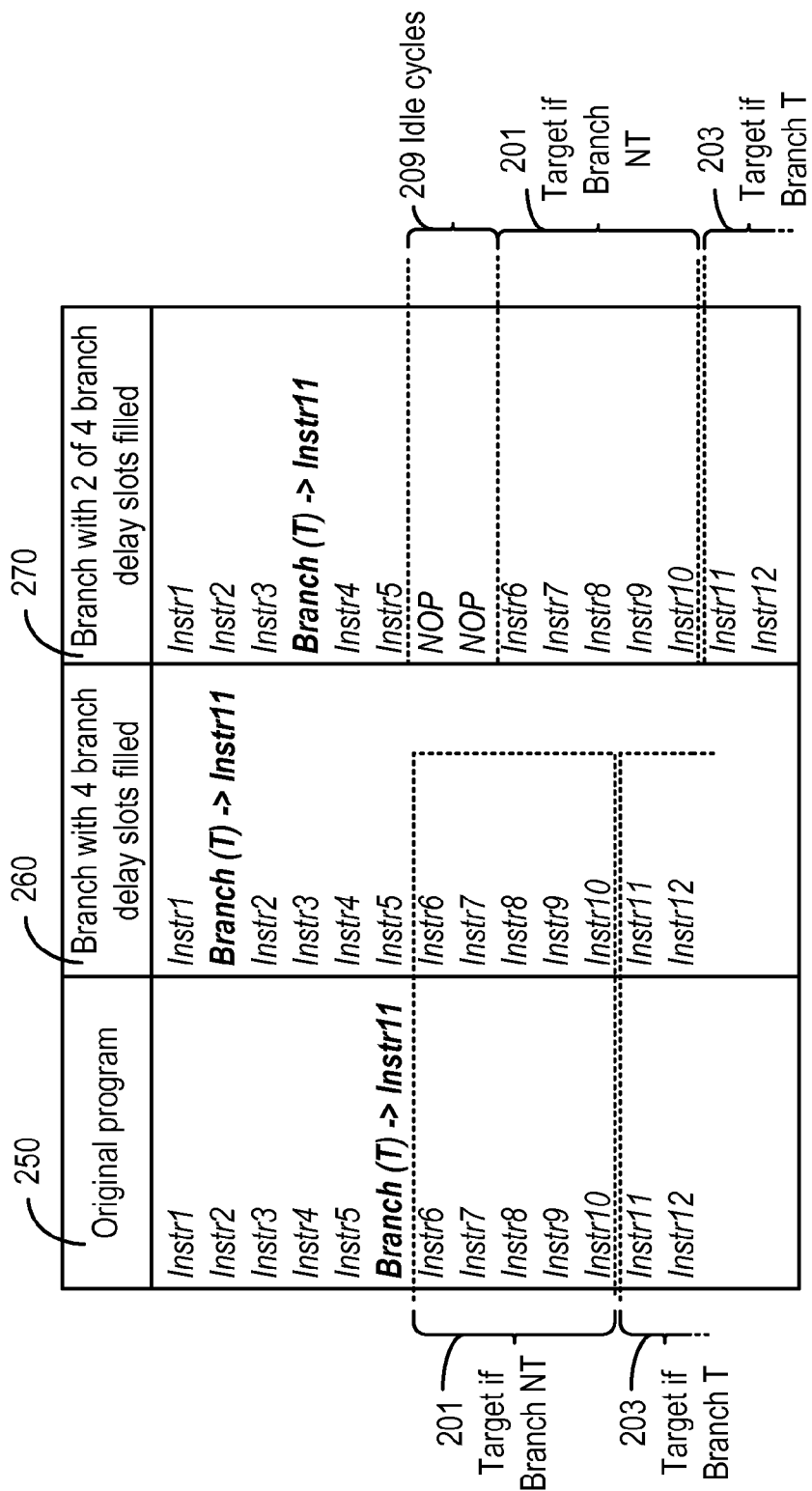
FIG. 2 illustrates code segments to which a branch delay slot strategy has been applied.
Figure 4:
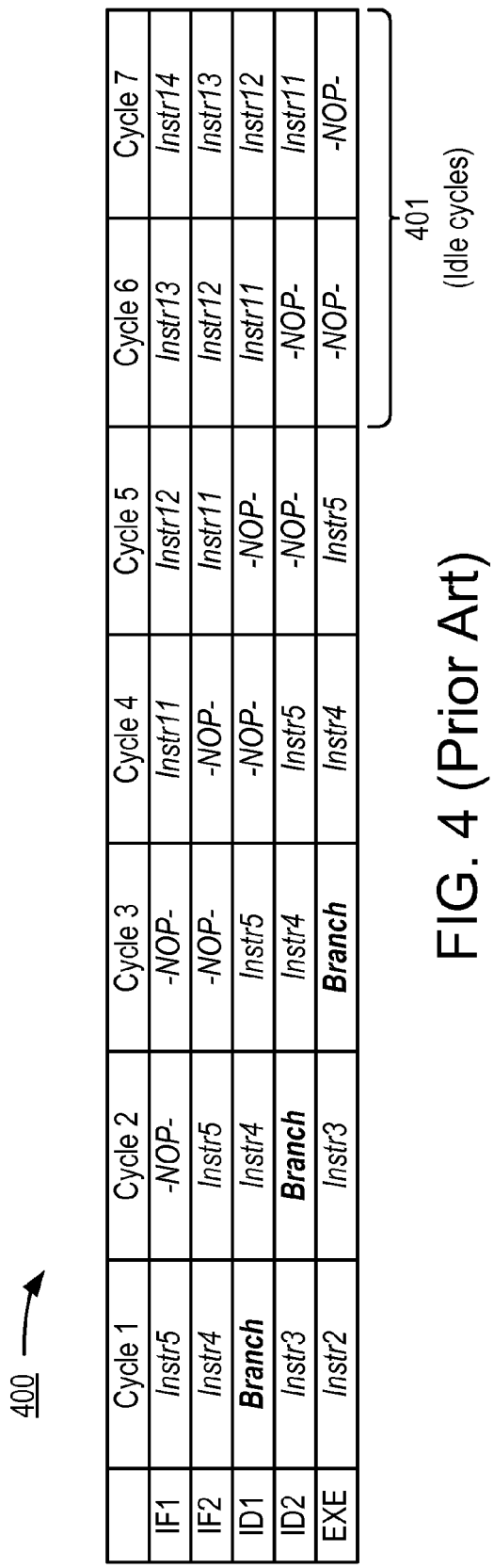
FIG. 4 is a processing sequence diagram that shows how processing in an exemplary pipelined processor would proceed with respect to a branch instruction shown in FIG. 2.

As mentioned earlier, the inventors have determined that each of the conventional techniques for dealing with idle cycles that result from execution of branch instructions in a pipelined processor falls short in a number of aspects. This will be understood from the following:

Looking first at the conventional branch delay slot strategy, its ability to influence branch execution performance is directly related to how well the compiler can fill the branch delay slots. If the code contains data dependencies that prevent branch delay slots from being fully filled, the resulting NOPs will lead to a performance penalty. Depending on the code and the pipeline depth this penalty can be significant. To illustrate this point, FIG. 4 is a processing sequence diagram 400 that shows how processing in the exemplary pipelined processor would proceed with respect to the branch instruction of FIG. 2, shown in "Branch with 2 of 4 branch delay slots filled". It can be seen that the branch delay slots (in this example, the four instructions immediately following the Branch instruction—these can be seen in Cycle 3) are only partially filled with program instructions, the rest being filled by two NOPs. As processing proceeds and instructions are advanced through the pipeline with each next cycle, the processor eventually experiences two idle cycles 401 when the NOPs reach the EXE stage in cycles 6 and 7.

Looking now at deficiencies of conventional branch prediction strategies, their ability to influence branch execution performance depends on the prediction rate (i.e., the rate at which correct predictions are made). If the BPU mispredicts a branch, the penalty is equal to the pipeline latency. Larger BPU memories and better BPU algorithms lead to fewer mispredictions and hence higher prediction rates. However, there will always be performance loss related to branch mispredictions.

Figure 5:
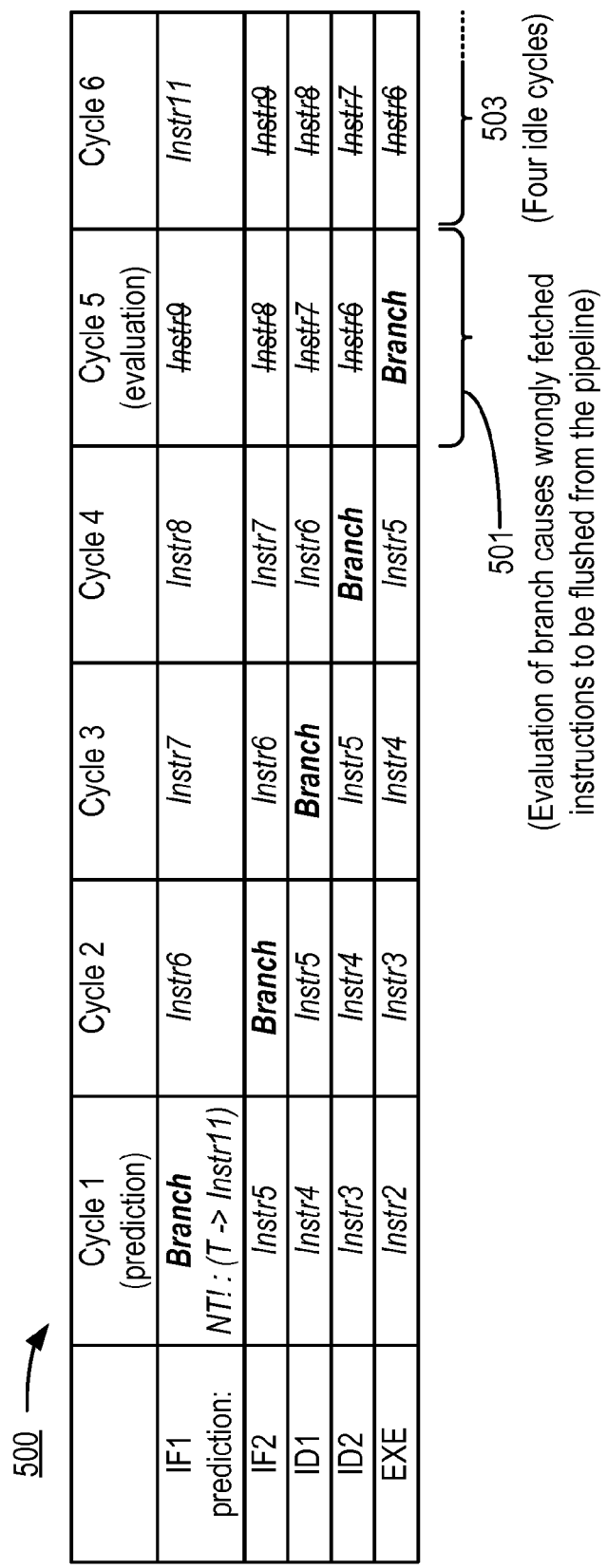
FIG. 5 is a processing sequence diagram that illustrates a performance improvement that can be achieved when branch target and direction can be correctly predicted.

To illustrate this point, FIG. 5 is a processing sequence diagram 500 that illustrates the performance improvement that can be achieved when branch target and direction can be correctly predicted. Using the same exemplary code segment shown as "Original program" 250 in FIG. 2 and an exemplary 5-stage pipelined processor with branch prediction, the processing sequence diagram 500 shows the pipeline in Cycle 1, at which point instructions Instr2, Instr3, instr4 and Instr5 are in pipeline stages EXE, ID2, ID1, and IF2, respectively. Further, the branch instruction has just been loaded into pipeline stage IF1.

In this example, as shown in the IF1 stage at Cycle 1, the branch instruction is processed, and the BPU mispredicts (indicated by the exclamation point, "!") that the branch will not be taken (NT), whereas the correct prediction (indicated in parentheses) should have been that the branch will be taken to target instruction Instr11.

As a result of the misprediction, the wrong target instructions (Instr6, instr7, Instr8, Instr9) are fetched in respective cycles 2, 3, 4, and 5. In Cycle 5, the branch instruction reaches the EXE stage of the pipeline and is evaluated 501. The evaluation results in the branch being taken to target instruction Instr11. A comparison of the evaluated branch result with the predicted branch result detects the mismatch, and this in-turn causes the wrongly fetched target instructions (Instr6, instr7, Instr8, Instr9) to be flushed (indicated in the figure by strikethrough text) from the ID2, ID1, IF2, and IF1 stages.

In response to the branch evaluation, the correct target instruction (Instr11) is fetched in the next cycle (Cycle 6) and this is loaded into the IF1 stage. Also in Cycle 6, the first of the four flushed instructions (Instr6) reaches the EXE stage of the pipeline. A flushed instruction is treated as a NOP. Since it will take four cycles for the flushed instructions to work their way through and out of the pipeline, this results in four idle cycles 503. As explained earlier, this reduces the performance of the pipelined processor.

In an aspect of some embodiments consistent with the invention, technology is employed that, in some respects, is a hybrid of branch delay slot and branch prediction technology.

In another aspect of some embodiments consistent with the invention, technology is provided that enables the number of branch delay slots to vary from instance to instance.

In yet another aspect of some embodiments consistent with the invention, the timing of branch prediction is different from that found in conventional technology.

These and other aspects are described in greater detail in the following.

Figure 6:
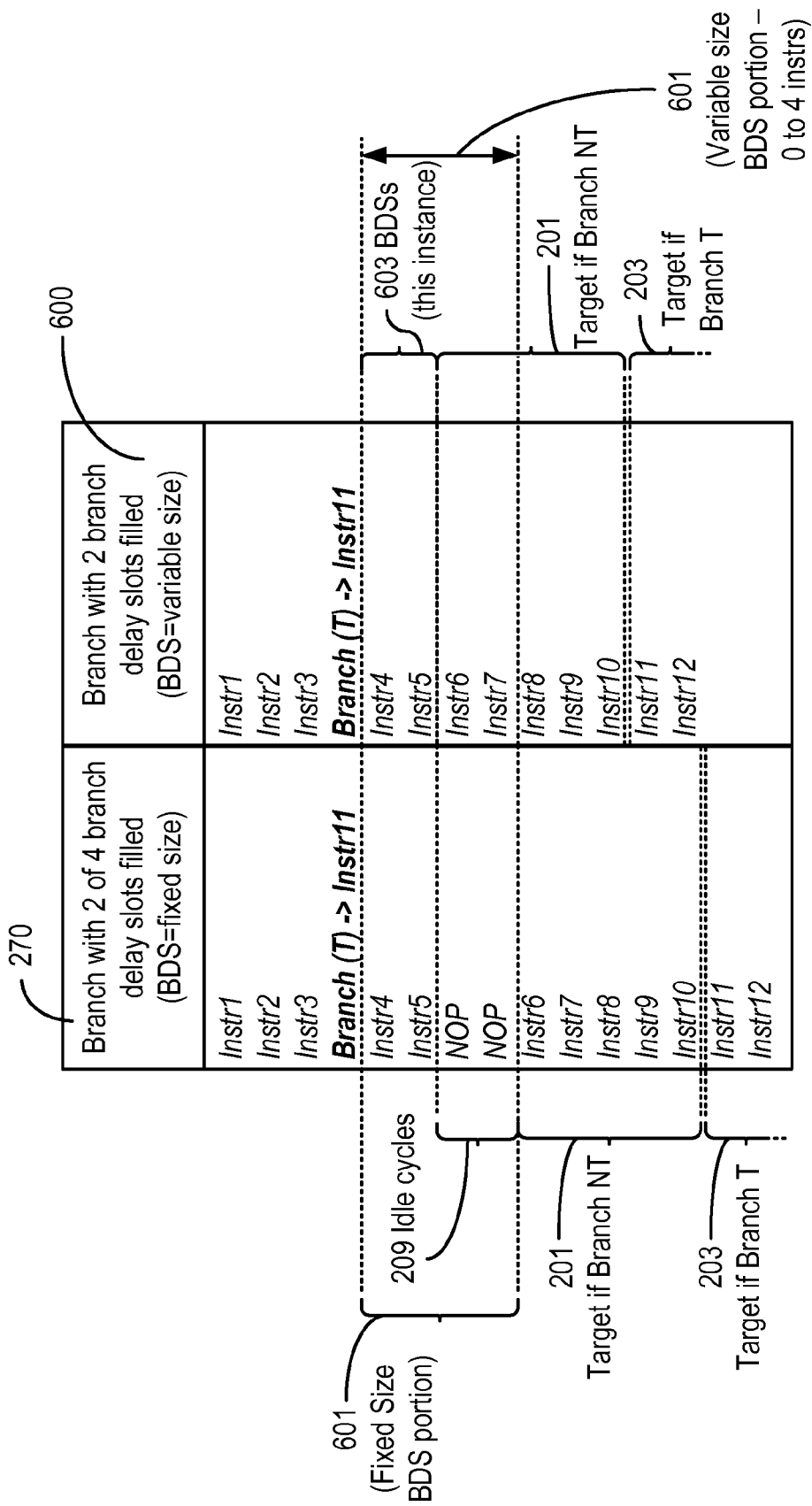
FIG. 6 is an illustration of an exemplary program segment designed in accordance with variable delay slot technology.

FIG. 6 is an illustration of an exemplary program segment 600 designed in accordance with variable delay slot technology. To facilitate an appreciation for the differences and advantages of this aspect of exemplary embodiments, the exemplary program segment 600 is depicted side-by-side with the program segment "Branch with 2 of 4 branch delay slots filled" 270 that was discussed above with reference to FIG. 2. In this rendering, the program segment "Branch with 2 of 4 branch delay slots filled" 270 has been further annotated to highlight the fixed size nature of the BDS portion 601—it is the conventional technology's use of a fixed size BDS portion 601 that forces the use of NOPs when it is not possible to further advance execution of the branch instruction. In this example, it was necessary to fill unusable branch delay slots with two NOPs, and this causes two idle cycles to be introduced into the processing.

Looking at the exemplary program segment 600, it can be seen that the branch instruction is advanced as far as possible and therefore is placed just after Instr3 (the same as in the program segment "Branch with 2 of 4 branch delay slots filled" 270). Immediately following the branch instruction is a variable size branch delay slot portion 601, the size of which can range from 0 instructions up to the size of the pipeline minus 1, which in this example is 5−1=4 instructions.

As with the program segment "Branch with 2 of 4 branch delay slots filled" 270, the branch instruction cannot be advanced to a location earlier than Instr3, so only two branch delay slots 603 are used in this instance: one for Instr4 and the other for Instr5. However, instead of populating the next two instruction locations with NOPs, the two branch delay slots 603 are immediately followed by the target instructions if the branch is not taken 201. These are followed by the target instructions if the branch is taken 203, beginning with Instr11.

Since the size of the branch delay slot portion 601 is variable, an aspect of some embodiments provides means for locating the actual end of the branch delay slot portion 601 for each instance. This is necessary at least because the processor's pipeline is of fixed size, and when an instance of the branch delay slot portion 601 is not its maximum size, it may still be necessary to flush some instructions from the pipeline if branch evaluation calls for a branch to be taken (e.g., in the example of FIG. 6, a branch taken condition would require that instructions Instr6 and Instr7 be flushed from the pipeline).

Figure 7:
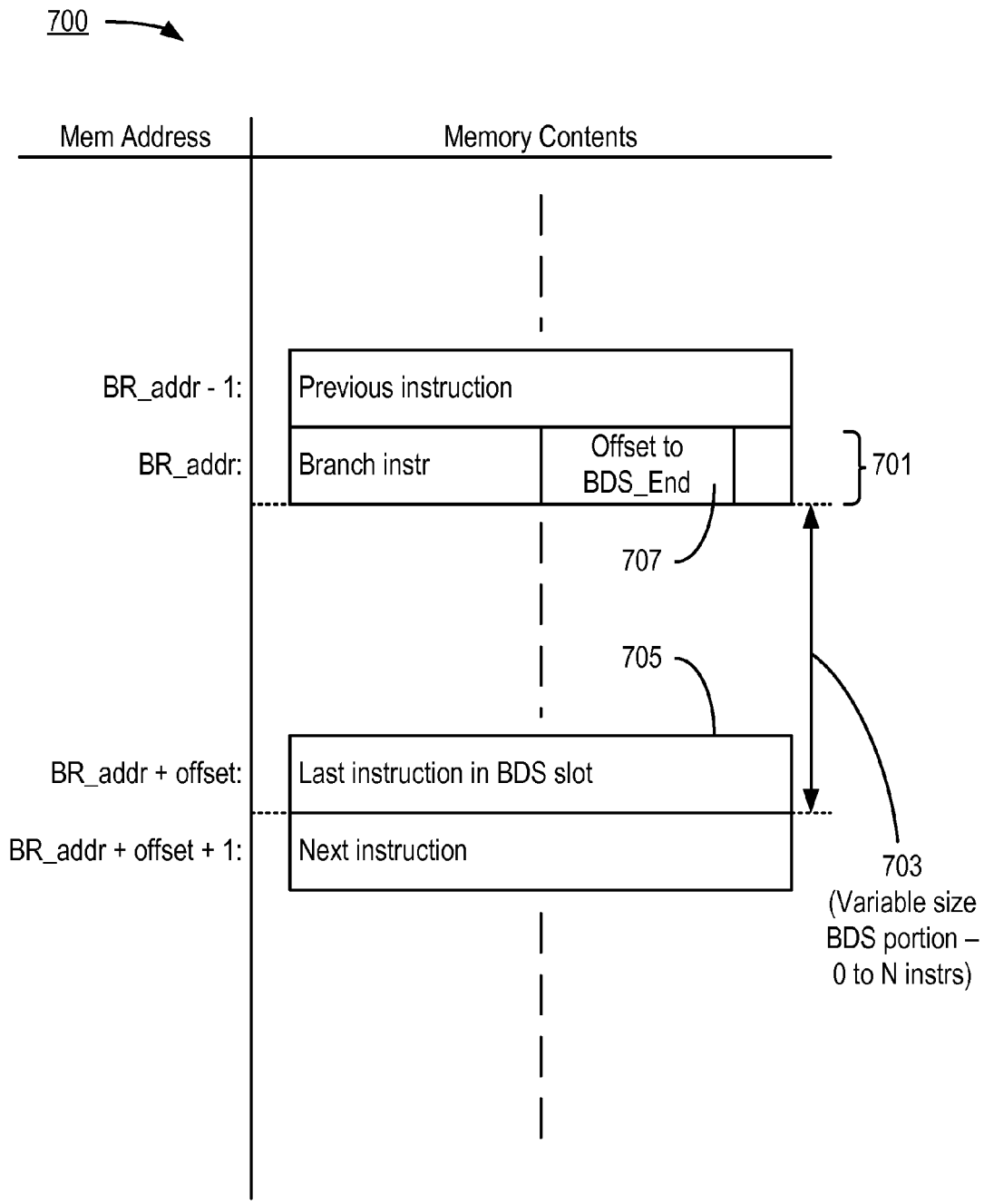
FIG. 7 is an exemplary embodiment of a program segment including a branch instruction, sequentially next instructions that may or may not include instructions within a variable size BDS portion associated with the branch instruction, and means for locating the last instruction within the variable size BDS portion.

FIG. 7 is an exemplary embodiment of a program segment 700 including a branch instruction 701, sequentially next instructions that may or may not include instructions within a variable size BDS portion 703 associated with the branch instruction 701, and means for locating the last instruction 705 within the variable size BDS portion 703. In this exemplary embodiment, the means for locating the last BDS instruction 705 is an offset field 707 within the branch instruction 701 itself. The offset field 707 may have any of the values 0 through N such that, given a branch instruction located at a memory address denoted BR_addr, the last BDS instruction 705 will be found at memory address BR_addr+ offset. It will be appreciated that an offset value equal to "0" means that there is no BDS portion, presumably because it was not possible to advance the branch instruction any earlier than its originally coded location.

The value encoded in the offset field 707 need not denote numbers of instructions. For example, when the memory contents are such that a unit of data stored in one of the memory's addressable locations contains more or fewer than one instruction, the offset value may be scaled in, for example, bytes or any other unit that the designer finds convenient.

In alternative embodiments, the means for locating the last instruction 705 within the variable size BDS portion 703 is not an offset, but may be any technique for designating the location of an instruction within the memory. For example, it can be, without limitation, a hard-coded memory address, or any form of indirect address (e.g., pointer to a register or other memory location at which a memory address or offset value can be obtained).

Variable branch delay slot technology allows the compiler to fill the branch delay slots on a best effort basis and to reduce the number of branch delay slots accordingly to eliminate the need to insert the filler NOPs that are found at the end of a conventionally produced set of branch delay slots. This enables a reduction in code-size but in many instances still results in flushed instructions and corresponding idle cycles when a branch is taken to a target instruction that has not been loaded in the pipeline just following the last branch delay slot. However, when variable branch delay slot technology is combined with branch prediction technology, a performance advantage can be obtained as well.

A conventional branch predictor makes its prediction based on the state of the processor from the point of view of the branch instruction itself, which means where the branch instruction occurs in the program flow. The inventors have recognized that such a predictor would be of little help when branch delay slots are being used because the actual moment of branching only occurs after the branch delay slots of the branch instruction. To address this problem, aspects of embodiments consistent with the invention use prediction technology that makes its prediction from the point of view of the last instruction in the branch delay slots.

Figure 8:
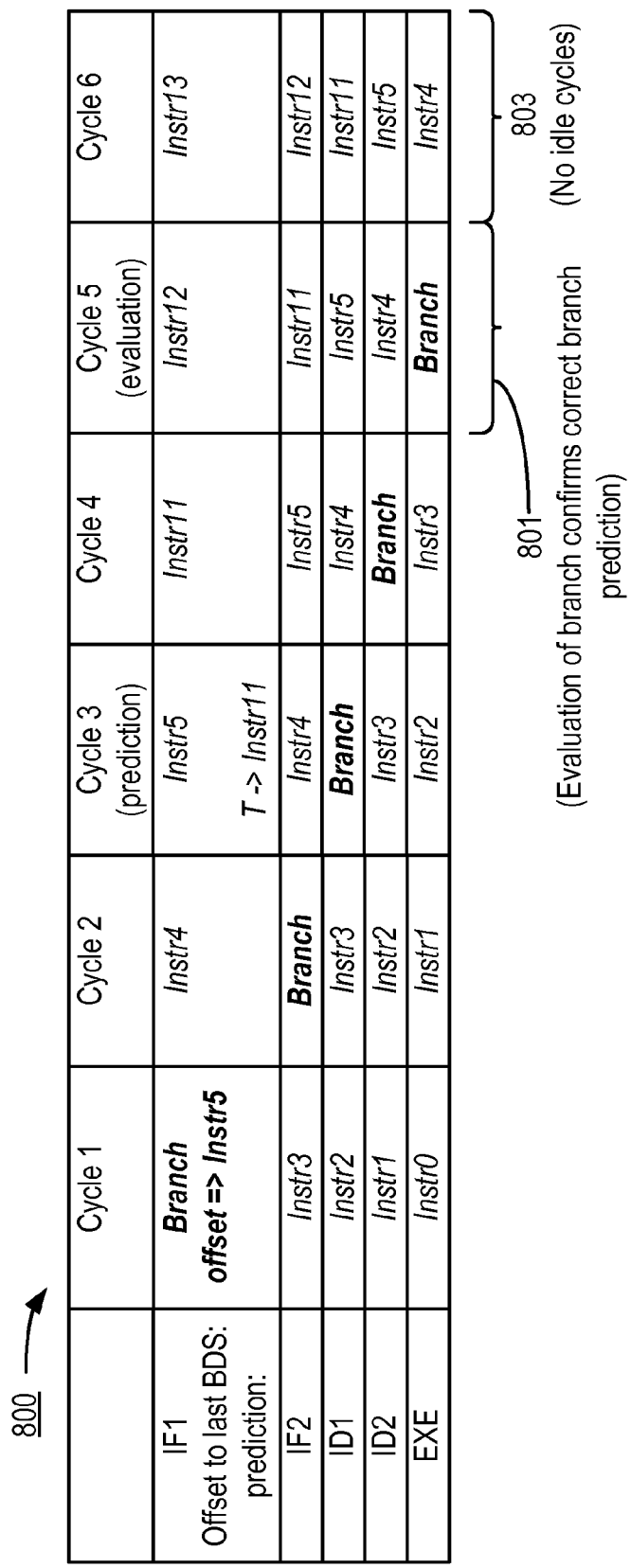
FIG. 8 is a processing sequence diagram that illustrates a performance improvement that can be achieved when branch target and direction can be correctly predicted in embodiments employing variable branch delay slot technology.

To illustrate this point, FIG. 8 is a processing sequence diagram 800 that illustrates the performance improvement that can be achieved when branch target and direction can be correctly predicted in embodiments employing variable branch delay slot technology. Using the same exemplary code segment shown as "Original program" 250 in FIG. 2 and an exemplary 5-stage pipelined processor with branch prediction being made based on the last instruction in the branch delay slot rather than on the branch instruction itself, the processing sequence diagram 800 shows the pipeline in Cycle 1, at which point instructions Instr0, Instr1, Instr2, Instr3 are in pipeline stages EXE, ID2, ID1, and IF2, respectively. Further, the branch instruction has just been loaded into pipeline stage IF1.

The branch instruction's offset to BDS_End 707 in this instance points to Instr5 being the last instruction in the branch delay slots. Therefore, no prediction is made at this time, and instructions are fetched from sequential locations in Cycle 2 and Cycle 3. It is worthwhile noting that, had this been an instance in which there are no branch delay slots (i.e., the offset points to the branch instruction itself), a prediction would be made in Cycle 1 based on the branch instruction.

In Cycle 3, Instr5 is loaded into the IF1 stage of the pipeline. Since the predictor knows that Instr5 is the last instruction occupying the branch delay slots, the predictor is invoked. In this example, the predictor correctly predicts that the branch will be taken, and that the target instruction will be Instr11. Consequently, Instr11 is fetched in the next cycle (Cycle 4) and fetching continues from sequential locations so that Instr12 is fetched in Cycle 5.

In Cycle 5, the branch instruction reaches the EXE stage of the pipeline. Its evaluation confirms that the earlier prediction was correct 801, so no instructions need to be flushed, and instruction fetching from sequential locations continues with Instr13 being fetched in Cycle 6.

A comparison of FIG. 8 with the corresponding example of FIG. 4 shows that the strategy of using variable delay slot technology in combination with branch prediction being made when the last instruction in the branch delay slot portion has been loaded into the pipeline eliminates, in this instance, the two idle cycles that occur in the conventional technology, and this is regardless of which branch direction is taken.

Figure 9:
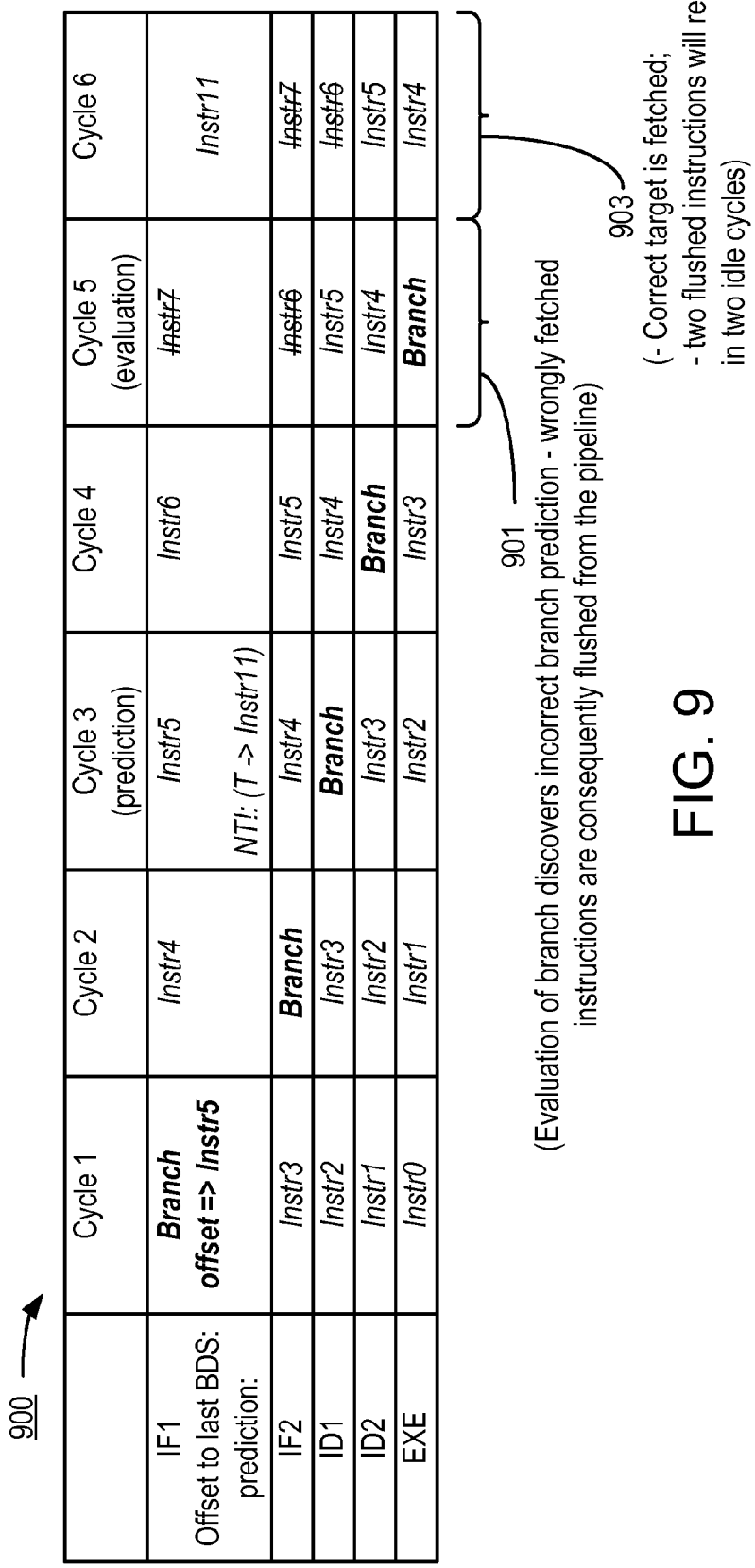
FIG. 9 is a processing sequence diagram that illustrates how performance is affected when branch target and direction are incorrectly predicted in embodiments employing variable branch delay slot technology.

FIG. 8 showed expected performance when a correct prediction is made. Now for comparison, FIG. 9 is a processing sequence diagram 900 that illustrates how performance is affected when branch target and direction are incorrectly predicted in embodiments employing variable branch delay slot technology. Using the same exemplary code segment shown as "Original program" 250 in FIG. 2 and an exemplary 5-stage pipelined processor with branch prediction being made based on the last instruction in the branch delay slot rather than on the branch instruction itself, the processing sequence diagram 900 shows the pipeline in Cycle 1, at which point instructions Instr0, Instr1, Instr2, Instr3 are in pipeline stages EXE, ID2, ID1, and IF2, respectively. Further, the branch instruction has just been loaded into pipeline stage IF1.

As in the previous example, the branch instruction's offset to BDS_End 707 in this instance points to Instr5 being the last instruction in the branch delay slots. Therefore, no prediction is made at this time, and instructions are fetched from sequential locations in Cycle 2 and Cycle 3.

In Cycle 5, Instr5 is loaded into the IF1 stage of the pipeline. Since the predictor knows that Instr5 is the last instruction occupying the branch delay slots, the predictor is invoked. In this example, the predictor incorrectly predicts that the branch will not be taken. (The correct prediction would have been that the branch would be taken and that the target instruction would be Instr11). Consequently, the next instruction in sequence, Instr6 is fetched in the next cycle (Cycle 4) and fetching continues from sequential locations so that Instr7 is fetched in Cycle 5.

In Cycle 5, the branch instruction reaches the EXE stage of the pipeline. Its evaluation results in the branch being taken to target instruction Instr11. A comparison of this result with the predicted result causes it to be discovered that that the earlier prediction was incorrect 901, so the wrongly fetched instructions Instr6 and Instr7 are flushed (their execution will be treated as NOPs). Instruction fetching begins with the correct target, Instr11, in Cycle 6.

Since the pipeline now contains two flushed instructions, the processor will experience two idle cycles before the first correctly fetched target instruction is executed 903.

It will be noticed first that, compared to use of conventional branch prediction technology, in which the branch instruction is always the branch source, the misprediction penalty in this instance has been reduced from four idle cycles (see FIG. 5) to two idle cycles (see FIG. 9).

It will be further observed that the performance of a pipeline with variable branch delay slots coupled with use of an end of branch delay slots predictor is at least as good as the performance of a pipeline that uses conventional fixed branch delay slot technology or a pipeline using only a convention predictor. When all branches are incorrectly predicted, the variable branch delay slots are there to mitigate the performance loss; this makes the solution as good as one with fixed branch delay slots. When it is not possible to fill any of the branch delay slots, the predictor will mitigate the performance loss; this makes the solution as good as one with just a predictor. Thus, there is no additional performance penalty from the disclosed embodiments.

Figure 10:
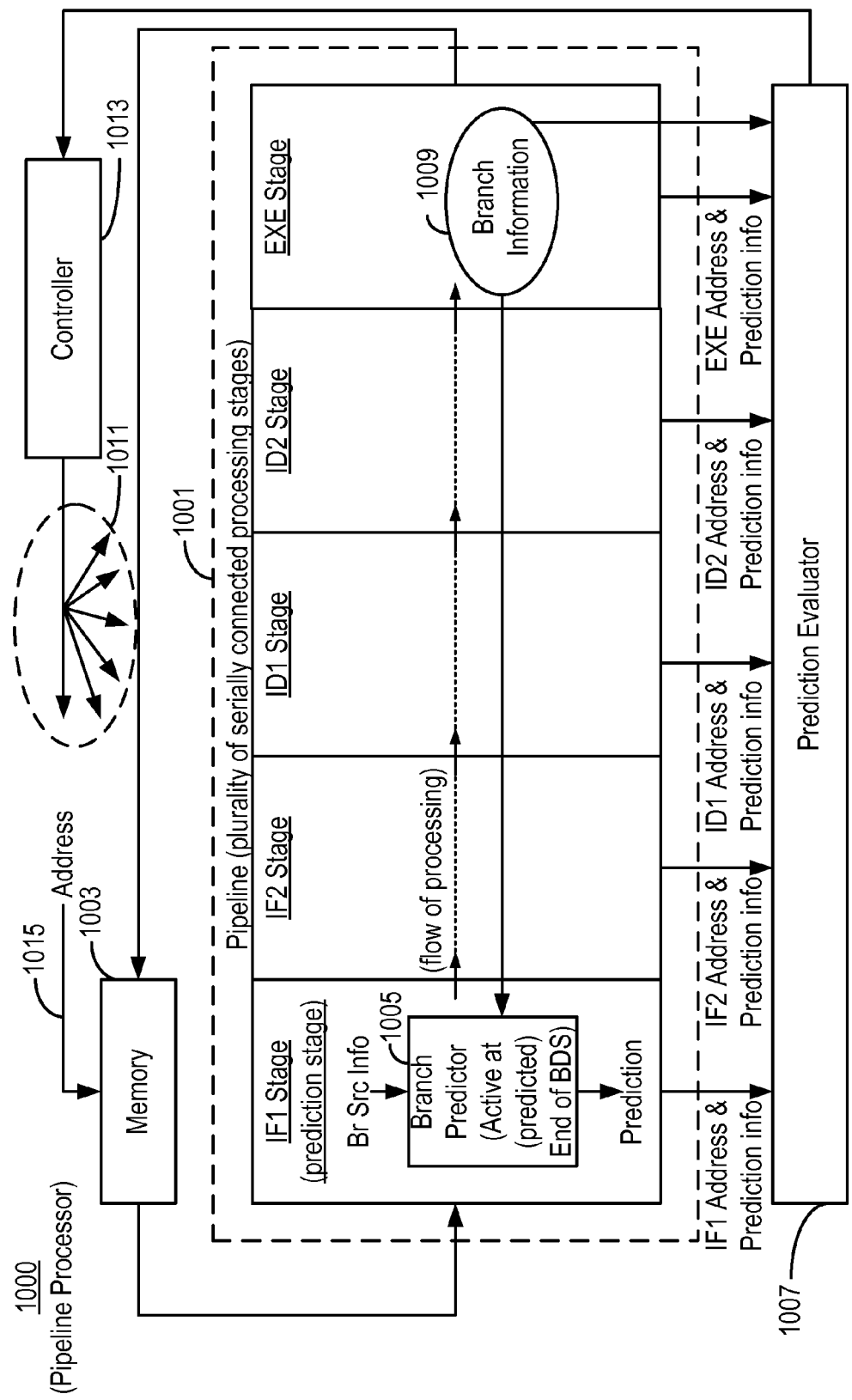
FIG. 10 is a block diagram of an exemplary pipelined processor consistent with the invention.

FIG. 10 is a block diagram of a pipelined processor 1000 in accordance with embodiments that are consistent with the invention. The pipelined processor 1000 includes a pipeline 1001 that is made up of a plurality of serially connected processing stages. In this example, there are five stages (IF1, IF2, ID1, ID2, and EXE), but the principles disclosed here are equally applicable to pipelines having a different number of processing stages (i.e., more or fewer than five).

Instructions for the pipeline are fetched from a memory 1003 and supplied to a first stage of the pipeline 1001, which in this example is the IF1 stage. As explained in greater detail earlier, the processing stages of the pipeline 1001 operate concurrently, each based on its own instruction (and possibly also data). Only the last stage of the pipeline 1001 (in this example, the EXE stage) is capable of changing the state of the pipelined processor 1000. To facilitate this aspect of processing, the last stage of the pipeline (e.g., EXE stage) can supply data to a data input port of the memory 1003.

The pipelined processor 1000 also includes a branch predictor 1005 that produces a predicted next address. The prediction algorithm used by the branch predictor 1005 can be instantiated by means of any known predictor algorithm, such as and without limitation, technology disclosed by Scott McFarling, "Combining Branch Predictors", WRL Technical Note TN-36, June 1993, pp. 1-25, Digital Western Research Laboratory, Palo Alto, Calif., USA. In the illustrated embodiment, the branch predictor 1005 bases its prediction on information (e.g., branch history, addresses, etc.) made available in the first stage (e.g., IF1) of the pipeline 1001. Because of its relationship with the branch predictor 1005, the first stage (e.g., IF1) is, in this embodiment, the designated "prediction stage." However, this aspect can be different in alternative embodiments. As just one of many possible examples, the predictor may instead be associated with the second processing stage (e.g., IF2 stage) of the pipeline 1001, in which case the second stage would be the prediction stage. To facilitate the description, the term "prediction stage" is herein used to refer to whichever one of the processing stages is associated with the branch predictor 1005 and supplies information that is used by the branch predictor 1005 to make a prediction.

Unlike predictors used in conventional pipelined technology, the branch predictor 1005 of embodiments consistent with the invention is activated when an instruction presently loaded in the prediction stage of the pipeline 1001 is in the last slot of a variable branch delay slot portion of a program. It will be observed that, since embodiments consistent with the invention permit branch instances in which the size of the branch delay slot portion is zero, it can sometimes be the case that a prediction is made when a branch instruction is in the prediction stage of the pipeline 1001. However, since the size of a branch delay slot portion is variable, meaning that it can vary from one branch instance to another, it is generally the case that any type of instruction may occupy the prediction stage at the time that a branch prediction is made, and that the associated branch instruction will already have occupied and then been shifted out of the branch prediction stage.

The pipelined processor also includes a prediction evaluator 1007 which detects when an earlier made prediction was wrong. As explained earlier, a wrong prediction requires that one or more instructions that were fetched as a result of the misprediction will have to be flushed from the stages of the pipeline 1001 that they are presently occupying, and fetching will have to start with the correct target instruction.

Detection of a prediction error is based partly on branch information 1009 that is produced from actual evaluation of the branch instruction. The branch information 1009 is typically produced in the last stage of the pipeline 1001 (e.g., in the EXE stage), but in alternative embodiments the branch information 1009 can be generated in other stages. For this reason, the stage in which the branch information 1009 is produced is herein referred to as a "branch evaluation stage". It will be recognized that, in the exemplary embodiment of FIG. 10, the last stage of the pipeline 1001 is also the branch evaluation stage of the pipeline 1001. However, the term "branch evaluation stage" is intended to be broader, covering any stage that produces this information.

Embodiments consistent with the invention differ from conventional technology in at least one respect because, whereas the prediction information ("branch source information") for conventional predictors is available in the same pipeline stage in which the branch resides, the prediction information for the branch predictor 1005 is stored with the instruction at the end of the branch delay slots. This means that instead of performing a direct evaluation of prediction accuracy in the branch evaluation stage of the pipeline 1001 (e.g., the EXE stage), the end of the branch delay slots must be found in the pipeline when the branch has reached the EXE stage.

Since embodiments consistent with the invention allow the size of the branch delay slot portion to vary from instance to instance, this involves searching through the pipeline to find the stage in which the end of the branch delay slots is at the time when the branch instruction is in the branch evaluation stage of the pipeline 1001. The prediction evaluator 1007 performs this search activity, and for this purpose receives, for example, address and prediction information from each of the pipeline stages.

With respect to the prediction evaluator's search activity, as explained earlier, the branch instruction includes means for locating the last BDS instruction, such as the offset field 707, from which the address of the end of the branch delay slots can be calculated. The addresses of each stage are then compared to the calculated address of the end of the branch delay slots. The prediction information of the pipeline stage for which the address matches the end of branch delay slots address is evaluated by means of the branch information 1009 from EXE. If the branch was predicted incorrectly, the wrongly fetched instructions in the pipeline stages following the end of the branch delay slots are flushed, and new instructions are fetched starting with the target instruction identified by evaluation of the branch instruction.

The above-described and other aspects of the pipelined processor 1000 are controlled by control signals 1011 generated by a controller 1013. For example, the controller 1013 ensures that the correct address 1015 (e.g., next sequential address or predicted address or evaluated branch address) is supplied to the memory 1003. The controller's operation is based on state information such as, for example, any one or combination of information representing the results of prediction evaluation, and information generated by the branch predictor 1005 (e.g., whether a prediction has been generated during a present cycle).

Figure 11:
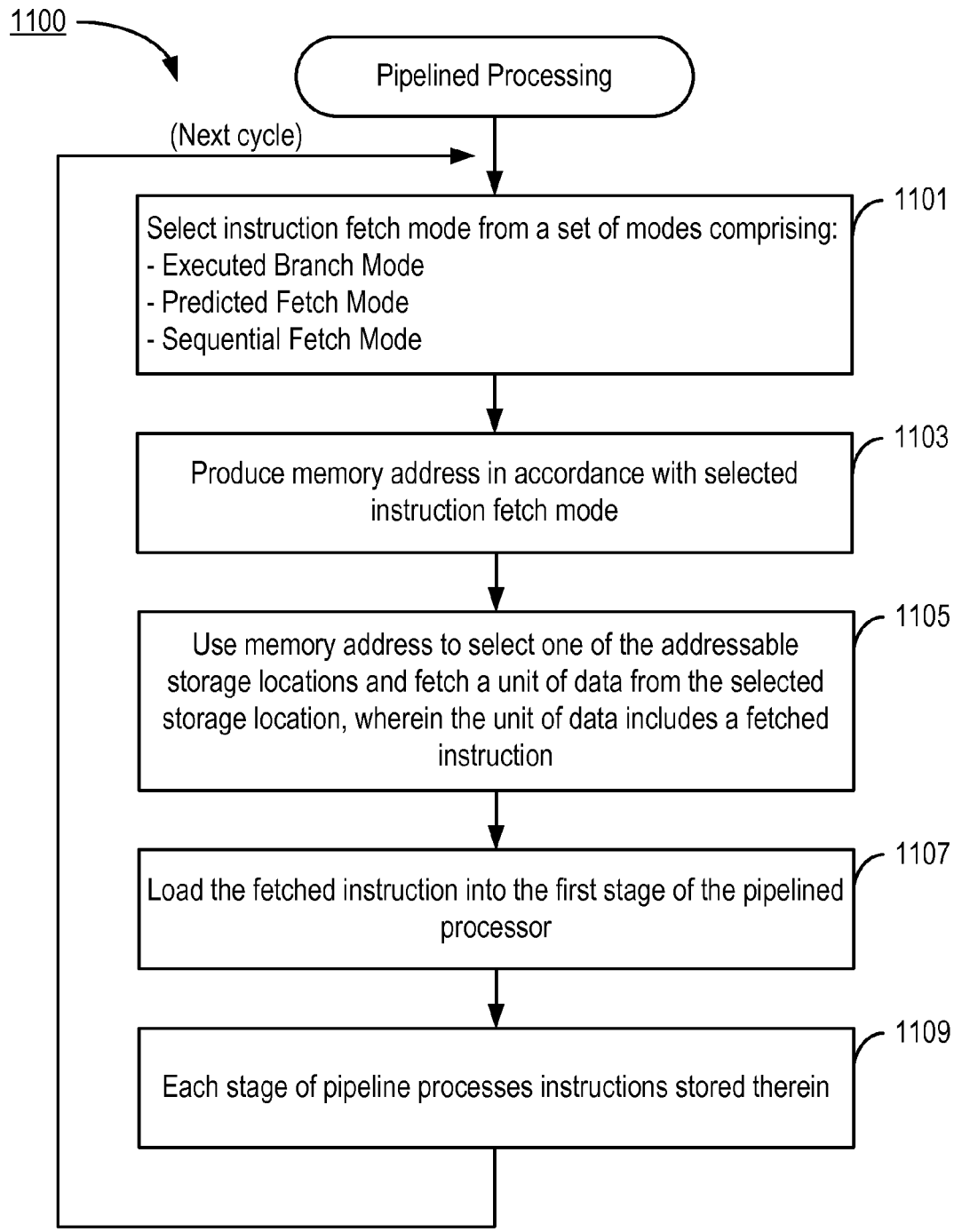
FIG. 11 is, in one respect, a flow chart of steps/processes performed by circuitry in accordance with some but not necessarily all exemplary embodiments of the invention for the purpose of fetching and executing instructions in a pipelined processor.

To further illustrate aspects of embodiments consistent with the invention, FIG. 11 is, in one respect, a flow chart of steps/processes performed by circuitry in accordance with some but not necessarily all exemplary embodiments of the invention for the purpose of fetching and executing instructions in a pipelined processor. In another respect, FIG. 11 can be considered to depict exemplary means 1100 comprising the various illustrated circuitry (e.g., hard-wired and/or suitably programmed processor) configured to perform the described functions. In accordance with the illustrated embodiment, for each cycle, the pipelined processor selects an instruction fetch mode from among a set of modes comprising an "executed branch mode", a "predicted fetch mode", and a "sequential fetch mode" (step 1101). Consistent with the earlier discussion:

The executed branch fetch mode comprises producing the memory address by evaluating a branch instruction loaded in the branch evaluation stage of the pipelined processor (e.g., in some but not necessarily all embodiments, the last stage).

The predicted fetch mode comprises generating a decision indicating whether an instruction loaded in the prediction stage represents the last branch delay slot of the set of branch delay slots. (E.g., in the example of FIG. 10, the prediction stage is the first stage (IF1 stage).) In response to the decision indicating that the instruction loaded in the prediction stage represents the last branch delay slot of the set of branch delay slots, the memory address is predicted based at least partly on the branch source information supplied by the prediction stage.

The sequential fetch mode comprises producing the memory address as a memory address that is a sequentially next occurring address after a present address.

Having selected an instruction fetch mode, a memory address is produced in accordance with the selected mode (step 1103). The memory address is then used to select one of the addressable storage locations and then fetch a unit of data from the selected storage location, wherein the fetched unit of data includes a fetched instruction (step 1105). The fetched instruction is then loaded into the first stage of the pipelined processor (step 1107).

Figure 12:
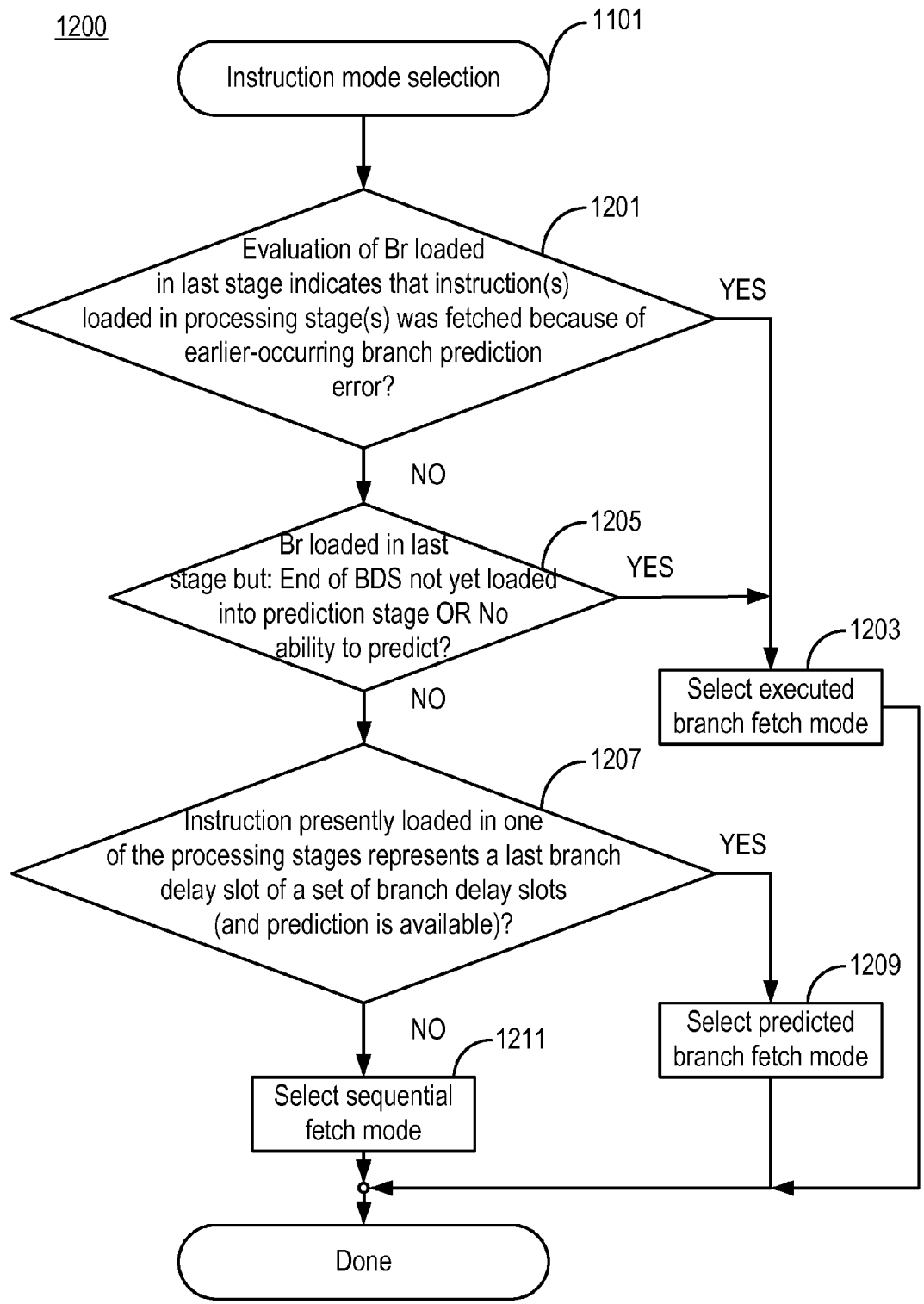
FIG. 12 is, in one respect, a flow chart of steps/processes performed by circuitry in accordance with some but not necessarily all exemplary embodiments of the invention for the purpose of carrying out an instruction fetch mode selection.

FIG. 12 is, in one respect, a flow chart of steps/processes performed by circuitry in accordance with some but not necessarily all exemplary embodiments of the invention for the purpose of carrying out the instruction fetch mode selection depicted as step 1101 in FIG. 11. In another respect, FIG. 12 can be considered to depict exemplary means 1200 comprising the various illustrated circuitry (e.g., hard-wired and/or suitably programmed processor) configured to perform the described functions.

In accordance with the illustrated embodiment, a test is performed to ascertain whether evaluation of a branch ("Br") instruction loaded in the branch evaluation stage of the pipelined processor indicates that at least one instruction loaded in one or more of the processing stages was fetched because of an earlier-occurring branch prediction error (decision block 1201). For example the address generated by evaluation of the branch instruction can be compared with the addresses of the fetched instructions following the last branch delay slot in the remaining processing stages of the pipeline. If no match is found, this indicates a prediction error. If a prediction error is detected ("YES" path out of decision block 1201), then the executed branch fetch mode is selected (step 1203) and fetch mode selection is complete. As illustrated in some earlier examples, the executed branch fetch mode may, in addition to generating a new fetch address based on the evaluated branch instruction, also need to flush one or more instructions from the pipeline if these had been fetched from a wrong branch path.

In some but not necessarily all embodiments, it may happen that a branch instruction reaches the branch evaluation stage (e.g., EXE) of the pipeline without the last branch delay slot of a set of branch delay slots associated with the branch instruction having been detected in the prediction stage. This can happen in a number of ways. In one instance, this can happen when the size of the branch delays slots exceeds the number of stages in the pipeline. In this case, the branch instruction can reach the branch evaluation stage of the pipeline without the last branch delay slot ever having been fetched. (It will be fetched in some future cycle, after the branch instruction has exited the branch evaluation stage of the pipeline.)

In another possible instance, even if the coded size of the branch delay slots is less than or equal to the number of stages from the prediction stage to the branch evaluation stage, it may happen that the program memory 1015 can be inaccessible for a few cycles due to entities external to pipelined processor accessing it. When this happens, the pipeline 1001 creates so-called "bubbles" (equivalent to NOPs) to fill these gaps in the instruction stream. The insertion of these dynamically generated NOPs has the effect of increasing the distance (measured in terms of number of instructions) between the branch instruction and the last branch delay slot associated with that branch instruction. Since the branch instruction has reached the branch evaluation stage in the pipeline, it has full knowledge about the branch operation (e.g., the direction of the branch and what the target address is), so there is no need to make a prediction. Instead, the actual branch information is used.

In yet another possible instance, it is noted that, although hardware could be designed to make use of the offset field 707 to know with certainty whether the last branch delay slot associated with a branch instruction is presently in or has already passed through the prediction stage of the pipeline, this comes with a high level of complexity. For this reason, some but not necessarily all embodiments consistent with the invention employ a prediction algorithm to generate a decision indicating whether an instruction loaded in the prediction stage represents the last branch delay slot of the set of branch delay slots. Since it is possible for this prediction to occasionally be wrong, it is possible that the last branch delay slot associated with a branch instruction is presently in or has already passed through the prediction stage of the pipeline without being detected.

It can also happen that that a branch instruction reaches the branch evaluation stage (e.g., EXE) of the pipeline and, even though it has been detected that the last branch delay slot of a set of branch delay slots associated with the branch instruction is presently in or has passed through the prediction stage, the prediction stage for whatever reason (e.g., insufficient training) has not been able to make a prediction.

Because of these various possibilities, in some but not necessarily all embodiments, if no prediction error is detected ("NO" path out of decision block 1201), a test is performed to determine whether a branch instruction is loaded in the branch evaluation stage of the pipelined processor and either one of the following conditions is true: (1) no decision has yet been generated that indicates that an instruction loaded in the prediction stage represents the last branch delay slot of the set of branch delay slots associated with the branch instruction; or (2) an instruction representing the last branch delay slot of the set of branch delay slots is presently in or has already passed through the prediction stage without the predictor having generated a prediction (decision block 1205). If either of these conditions is the case ("YES" path out of decision block 1205), then the executed branch fetch mode is selected (step 1203) and fetch mode selection is complete. It will be recognized that embodiments can be constructed that test only for condition "(1)" or for condition "(2)" without testing for both of them (e.g., a predictor can be devised that always generates a prediction, even if it is unreliable).

Although it is not depicted in FIG. 12 in order to avoid cluttering the figure, in some but not necessarily all embodiment another basis for selecting executed branch fetch mode occurs when a branch instruction is loaded in the branch evaluation stage of the pipelined processor during the same cycle that a prediction is being made (i.e., the branch instruction is in the branch evaluation stage during the same cycle that the instruction representing the last branch delay slot of the set of branch delay slots is in the prediction stage. In this instance, a collision of sorts occurs because two different sources (branch execution and prediction) are generating target addresses. In this case, the executed branch fetch mode is selected because of its unquestioned reliability.

If none of the predicates for selecting executed branch fetch mode have been satisfied, ("NO" path out of decision block 1205), then a test is performed to ascertain whether the instruction presently loaded in the prediction stage of the pipeline represents a last branch delay slot of a set of branch delay slots (decision block 1207). As mentioned above, this determination can be based entirely on prediction technology without actually evaluating aspects of the branch instruction and the length of its associated set of branch delay slots. If the prediction stage does contain the last branch delay slot ("YES" path out of decision block 1207), and assuming that the predictor is able to generate a prediction, then the predicted branch fetch mode is selected (step 1209) and fetch mode selection is complete.

Finally, if neither executed branch fetch mode nor predicted branch fetch mode have been selected ("NO" path out of decision block 1207), then the sequential fetch mode is selected (step 1211).

Figure 13:
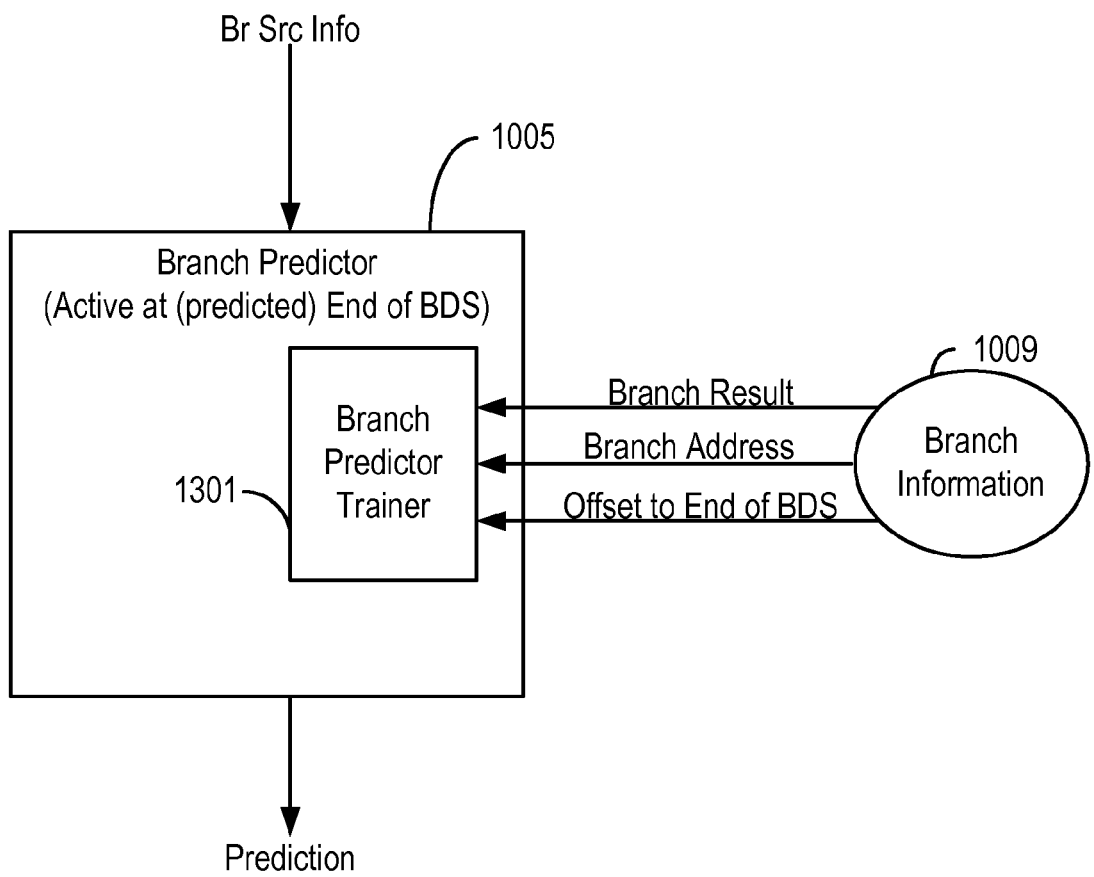
FIG. 13 a block diagram showing, in greater detail, the branch predictor of FIG. 10.

Earlier it was mentioned that at least some embodiments employ prediction technology to decide whether the instruction presently loaded in the prediction stage of the pipeline represents a last branch delay slot of a set of branch delay slots. This prediction technology is essentially the same as the prediction technology known in the art for making branch predictions (e.g., as described in the McFarling publication referenced earlier). One difference from conventional techniques, however, can be found with respect to the training of this technology. Whereas in conventional technology the branch instruction and the branch source are one and the same, the various embodiments consistent with the invention have the ability to, in at least some instances, separate the branch instruction from the branch source (e.g., in cases in which the end of the branch delay slot portion of the program is not the same as the associated branch instruction). To account for this difference, embodiments consistent with the invention determine an address of the instruction that is the end of the branch delay slot portion, and use this address for training instead of the address of the branch instruction when the branch instruction is being evaluated. FIG. 13 is a more detailed block diagram of the branch predictor 1005 of FIG. 10. Here it can be seen that the branch predictor 1005 includes circuitry configured as a branch predictor trainer 1301. For purposes of training, the branch predictor trainer 1301 receives the branch results from branch evaluation, the address of the branch instruction, and the offset value that was coded as part of the branch instruction. The branch predictor trainer 1301 determines the address for the instruction that is the end of the branch delay slot portion by, for example, adding the value in the branch instructions' offset field 707 to the address of the branch instruction. This address along with the results of branch evaluation (e.g., whether the branch was taken or not) are used to train the branch predictor.

The invention has been described with reference to particular embodiments. However, it will be readily apparent to those skilled in the art that it is possible to embody the invention in specific forms other than those of the embodiment described above.

For example, the various embodiments described above refer to conditional branch instructions, in which the direction of the branch can vary from one execution to the next. However, it will be appreciated that the problem described above with respect to conditional branches (i.e., the need to flush instructions from the pipeline when execution of the branch reveals that the pipeline has been filled with instructions from the wrong branch path) is also presented in the case of unconditional branch instructions. For this reason, the above-described embodiments are not limited to use only with conditional branch instructions. Therefore, as used herein, unless it is preceded by a qualifier such as "conditional" or "unconditional", the term "branch" is intended as a generic term that encompasses both conditional and unconditional branches.

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of controlling a pipelined processor having a plurality of serially connected processing stages including a first stage and a branch evaluation stage, wherein one of the processing stages other than the branch evaluation stage is a prediction stage that supplies branch source information for making branch predictions, wherein the pipelined processor is operatively coupled to a memory that comprises a plurality of addressable storage locations, each storage location being for storing one unit of data, the method comprising:

for each one of a plurality of sequentially occurring cycles:
  selecting an instruction fetch mode from a plurality of fetch modes comprising an executed branch fetch mode, a predicted fetch mode, and a sequential fetch mode;
  producing a memory address in accordance with the selected instruction fetch mode;
  using the memory address to select one of the addressable storage locations and fetching a unit of data from the selected storage location, wherein the fetched unit of data includes a fetched instruction; and
  loading the fetched instruction into the first stage of the pipelined processor,
wherein:
  the pipelined processor executes instructions from an instruction set that includes a branch instruction;
  each branch instruction is associated with a set of branch delay slots whose size can be greater than or equal to zero and whose size can be different from one instance of a branch instruction to another;

the executed branch fetch mode comprises producing the memory address by evaluating a branch instruction loaded in the branch evaluation stage of the pipelined processor;

the predicted fetch mode comprises:
  generating a decision indicating whether an instruction loaded in the prediction stage represents the last branch delay slot of the set of branch delay slots; and
  in response to the decision indicating that the instruction loaded in the prediction stage represents the last branch delay slot of the set of branch delay slots, predicting the memory address based at least partly on the branch source information supplied by the prediction stage; and the sequential fetch mode comprises producing the memory address as a memory address that is a sequentially next occurring address after a present address.

2. The method of claim 1, wherein selecting the instruction fetch mode comprises:
  selecting the executed branch fetch mode if evaluation of a branch instruction loaded in the branch evaluation stage of the pipelined processor indicates that at least one instruction loaded in one or more of the processing stages was fetched because of an earlier-occurring branch prediction error;
  selecting the predicted fetch mode if at least the following criteria are true: the executed branch fetch mode is not being selected and a decision has been generated that indicates that an instruction loaded in the prediction stage represents the last branch delay slot of the set of branch delay slots; and
  selecting the sequential fetch mode if neither the executed branch mode nor the predicted branch mode is selected.

3. The method of claim 2, wherein selecting the instruction fetch mode further comprises:
  selecting the executed branch fetch mode if a branch instruction is loaded in the branch evaluation stage of the pipelined processor and no decision has yet been generated that indicates that an instruction loaded in the prediction stage represents the last branch delay slot of the set of branch delay slots associated with the branch instruction.

4. The method of claim 2, wherein selecting the instruction fetch mode further comprises:
  selecting the executed branch fetch mode if a branch instruction is loaded in the branch evaluation stage of the pipelined processor and no prediction regarding the branch instruction has been made.

5. The method of claim 2, wherein selecting the predicted fetch mode comprises:
  selecting the predicted fetch mode if at least the following criteria are true: the executed branch fetch mode is not being selected and a decision has been generated that indicates that an instruction loaded in the prediction stage represents the last branch delay slot of the set of branch delay slots and a prediction can be generated.

6. The method of claim 1, wherein generating the decision indicating whether the instruction loaded in the prediction stage represents the last branch delay slot of the set of branch delay slots comprises:
  using the branch source information supplied by the prediction stage to predict the decision indicating whether the instruction loaded in the prediction stage represents the last branch delay slot of the set of branch delay slots.

7. The method of claim 1, comprising:
  flushing the at least one instruction loaded in one or more of the processing stages that was fetched because of an earlier-occurring branch prediction error, wherein an idle cycle results from execution of a flushed instruction in a last stage of the pipelined processor.

8. The method of claim 1, wherein the prediction stage is the first stage of the pipelined processor or a second stage of the pipelined processor.

9. The method of claim 1, wherein the branch instruction is a conditional branch instruction.

10. The method of claim 1, comprising:
  training a branch predictor based on branch evaluation results generated by the branch evaluation stage when the branch instruction is loaded in the branch evaluation stage and on an address of an instruction that represents the last branch delay slot of the set of branch delay slots associated with the branch instruction.

11. An apparatus for controlling a pipelined processor having a plurality of serially connected processing stages including a first stage and a branch evaluation stage, wherein one of the processing stages other than the branch evaluation stage is a prediction stage that supplies branch source information for making branch predictions, wherein the pipelined processor is operatively coupled to a memory that comprises a plurality of addressable storage locations, each storage location being for storing one unit of data, the apparatus comprising:
  a controller configured to cause the pipelined processor to perform, for each one of a plurality of sequentially occurring cycles:
    selecting an instruction fetch mode from a plurality of fetch modes comprising an executed branch fetch mode, a predicted fetch mode, and a sequential fetch mode;
    producing a memory address in accordance with the selected instruction fetch mode;
    using the memory address to select one of the addressable storage locations and fetching a unit of data from the selected storage location, wherein the fetched unit of data includes a fetched instruction; and
    loading the fetched instruction into the first stage of the pipelined processor,
  wherein:
  the pipelined processor executes instructions from an instruction set that includes a branch instruction;
  each branch instruction is associated with a set of branch delay slots whose size can be greater than or equal to zero and whose size can be different from one instance of a branch instruction to another;
  the executed branch fetch mode comprises producing the memory address by evaluating a branch instruction loaded in the branch evaluation stage of the pipelined processor;
  the predicted fetch mode comprises:
    generating a decision indicating whether an instruction loaded in the prediction stage represents the last branch delay slot of the set of branch delay slots; and
    in response to the decision indicating that the instruction loaded in the prediction stage represents the last branch delay slot of the set of branch delay slots, predicting the memory address based at least partly on the branch source information supplied by the prediction stage; and the sequential fetch mode comprises producing the memory address as a memory address that is a sequentially next occurring address after a present address.

12. The apparatus of claim 11, wherein selecting the instruction fetch mode comprises:
selecting the executed branch fetch mode if evaluation of a branch instruction loaded in the branch evaluation stage of the pipelined processor indicates that at least one instruction loaded in one or more of the processing stages was fetched because of an earlier-occurring branch prediction error;
selecting the predicted fetch mode if at least the following criteria are true: the executed branch fetch mode is not being selected and a decision has been generated that indicates that an instruction loaded in the prediction stage represents the last branch delay slot of the set of branch delay slots; and
selecting the sequential fetch mode if neither the executed branch mode nor the predicted branch mode is selected.

13. The apparatus of claim 12, wherein selecting the instruction fetch mode further comprises:
selecting the executed branch fetch mode if a branch instruction is loaded in the branch evaluation stage of the pipelined processor and no decision has yet been generated that indicates that an instruction loaded in the prediction stage represents the last branch delay slot of the set of branch delay slots associated with the branch instruction.

14. The apparatus of claim 12, wherein selecting the instruction fetch mode further comprises:
selecting the executed branch fetch mode if a branch instruction is loaded in the branch evaluation stage of the pipelined processor and no prediction regarding the branch instruction has been made.

15. The apparatus of claim 12, wherein selecting the predicted fetch mode comprises:
selecting the predicted fetch mode if at least the following criteria are true: the executed branch fetch mode is not being selected and a decision has been generated that indicates that an instruction loaded in the prediction stage represents the last branch delay slot of the set of branch delay slots and a prediction can be generated.

16. The apparatus of claim 11, wherein generating the decision indicating whether the instruction loaded in the prediction stage represents the last branch delay slot of the set of branch delay slots comprises:
using the branch source information supplied by the prediction stage to predict the decision indicating whether the instruction loaded in the prediction stage represents the last branch delay slot of the set of branch delay slots.

17. The apparatus of claim 11, wherein the controller is further configured to cause the pipelined processor to flush the at least one instruction loaded in one or more of the processing stages that was fetched because of an earlier-occurring branch prediction error, wherein an idle cycle results from execution of a flushed instruction in a last stage of the pipelined processor.

18. The apparatus of claim 11, wherein the prediction stage is the first stage of the pipelined processor or a second stage of the pipelined processor.

19. The apparatus of claim 11, wherein the branch instruction is a conditional branch instruction.

20. The apparatus of claim 11, comprising:
training circuitry that trains a branch predictor based on branch evaluation results generated by the branch evaluation stage when the branch instruction is loaded in the branch evaluation stage and on an address of an instruction that represents the last branch delay slot of the set of branch delay slots associated with the branch instruction.

21. A pipelined processor comprising:
a plurality of serially connected processing stages including a first stage and a branch evaluation stage, wherein one of the processing stages other than the branch evaluation stage is a prediction stage that supplies branch source information for making branch predictions;
a memory that comprises a plurality of addressable storage locations, each storage location being for storing one unit of data, wherein the pipelined processor is operatively coupled to the memory; and
a controller configured to cause the pipelined processor to perform, for each one of a plurality of sequentially occurring cycles:
selecting an instruction fetch mode from a plurality of fetch modes comprising an executed branch fetch mode, a predicted fetch mode, and a sequential fetch mode;
producing a memory address in accordance with the selected instruction fetch mode;
using the memory address to select one of the addressable storage locations and fetching a unit of data from the selected storage location, wherein the fetched unit of data includes a fetched instruction; and
loading the fetched instruction into the first stage of the pipelined processor,
wherein:
the pipelined processor executes instructions from an instruction set that includes a branch instruction;
each branch instruction is associated with a set of branch delay slots whose size can be greater than or equal to zero and whose size can be different from one instance of a branch instruction to another;
the executed branch fetch mode comprises producing the memory address by evaluating a branch instruction loaded in the branch evaluation stage of the pipelined processor;
the predicted fetch mode comprises:
generating a decision indicating whether an instruction loaded in the prediction stage represents the last branch delay slot of the set of branch delay slots; and
in response to the decision indicating that the instruction loaded in the prediction stage represents the last branch delay slot of the set of branch delay slots, predicting the memory address based at least partly on the branch source information supplied by the prediction stage; and
the sequential fetch mode comprises producing the memory address as a memory address that is a sequentially next occurring address after a present address.

22. The pipelined processor of claim 21, wherein selecting the instruction fetch mode comprises:
selecting the executed branch fetch mode if evaluation of a branch instruction loaded in the branch evaluation stage of the pipelined processor indicates that at least one instruction loaded in one or more of the processing stages was fetched because of an earlier-occurring branch prediction error;
selecting the predicted fetch mode if at least the following criteria are true: the executed branch fetch mode is not being selected and a decision has been generated that indicates that an instruction loaded in the prediction stage represents the last branch delay slot of the set of branch delay slots; and selecting the sequential fetch mode if neither the executed branch mode nor the predicted branch mode is selected.

23. The pipelined processor of claim 22, wherein selecting the instruction fetch mode further comprises:

selecting the executed branch fetch mode if a branch instruction is loaded in the branch evaluation stage of the pipelined processor and no decision has yet been generated that indicates that an instruction loaded in the prediction stage represents the last branch delay slot of the set of branch delay slots associated with the branch instruction.

* * * * *